Nov. 28, 1933.　　　S. E. BUETTELL ET AL　　　1,937,189
VEHICLE STORAGE SYSTEM
Filed Oct. 29, 1928　　　10 Sheets-Sheet 1
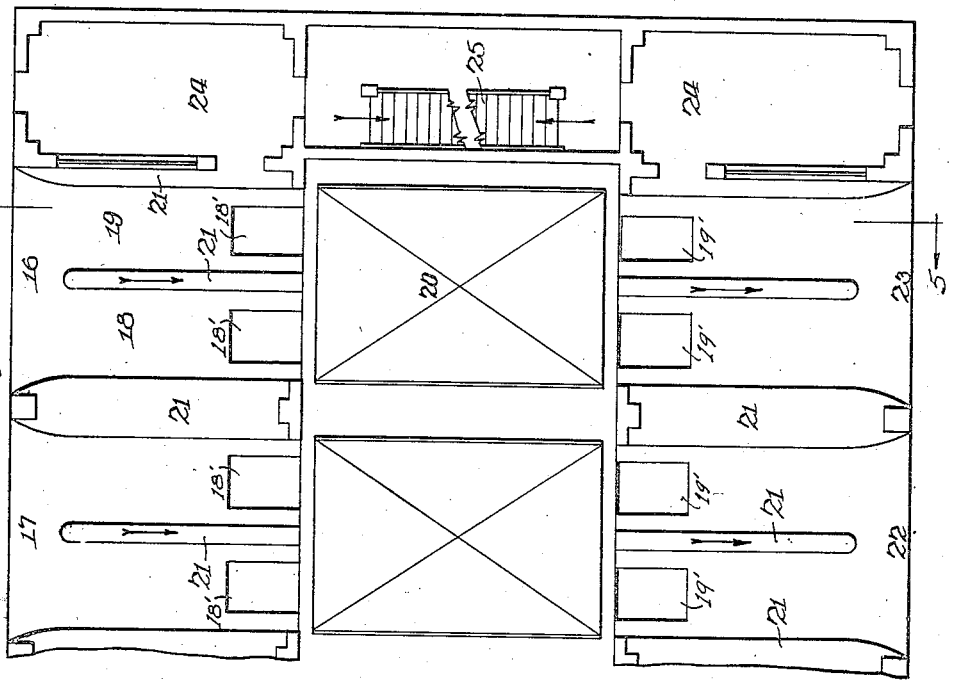
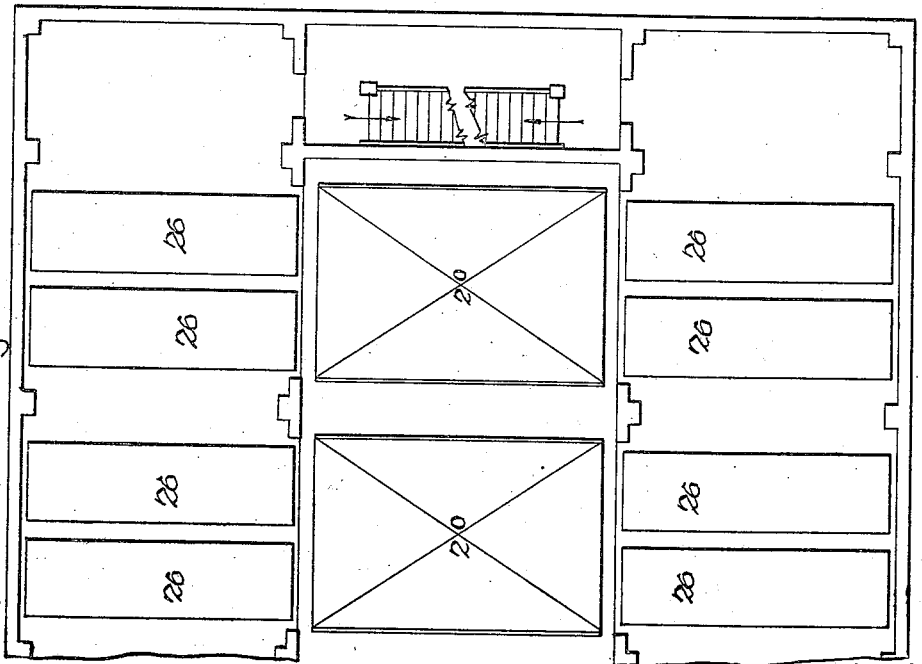
Inventors:
Samuel E. Buettell and Julius J. Gruenfeld
By John E. Gardner
Atty.

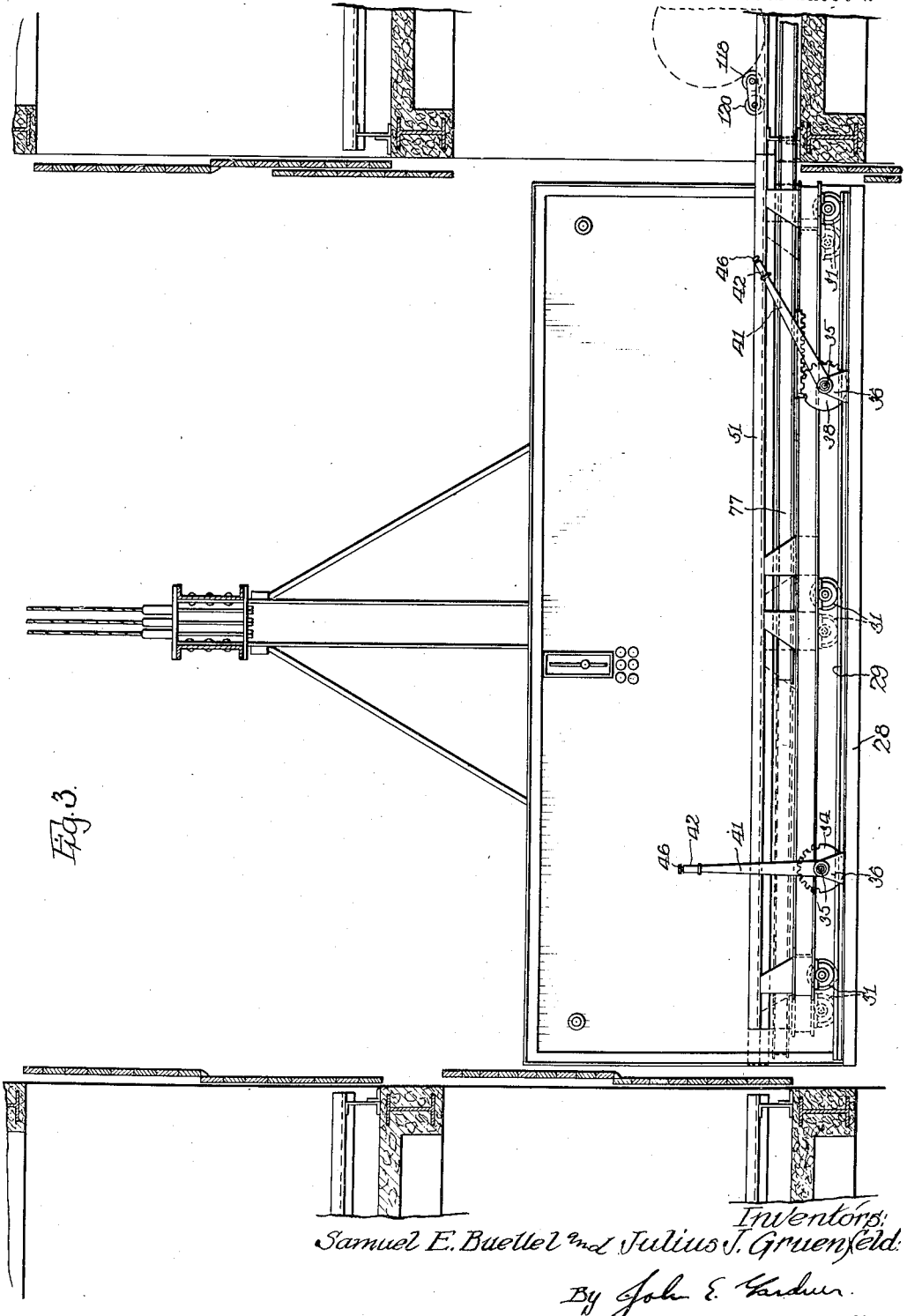

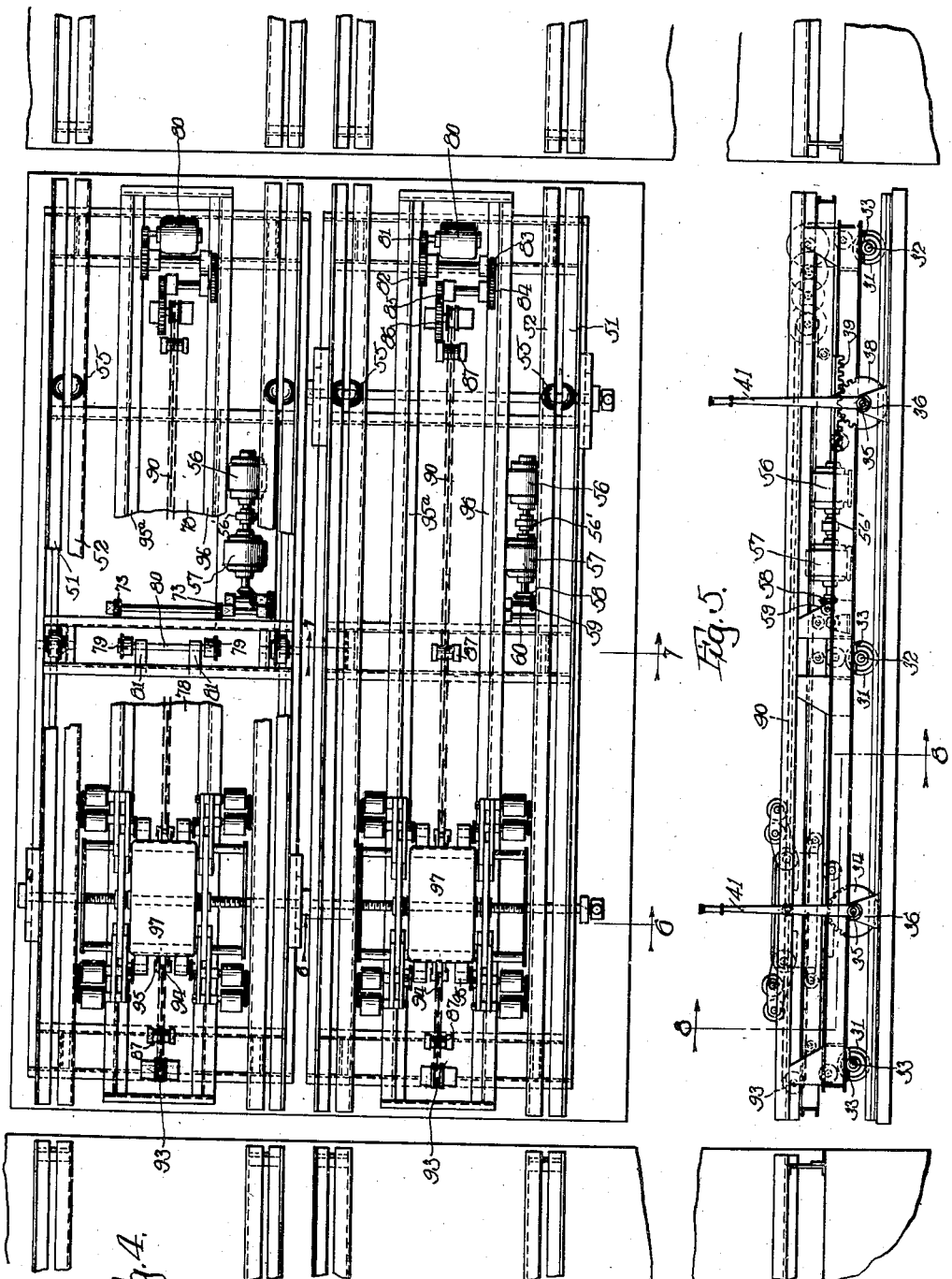

Nov. 28, 1933.　　S. E. BUETTELL ET AL　　1,937,189
VEHICLE STORAGE SYSTEM
Filed Oct. 29, 1928　　10 Sheets-Sheet 4
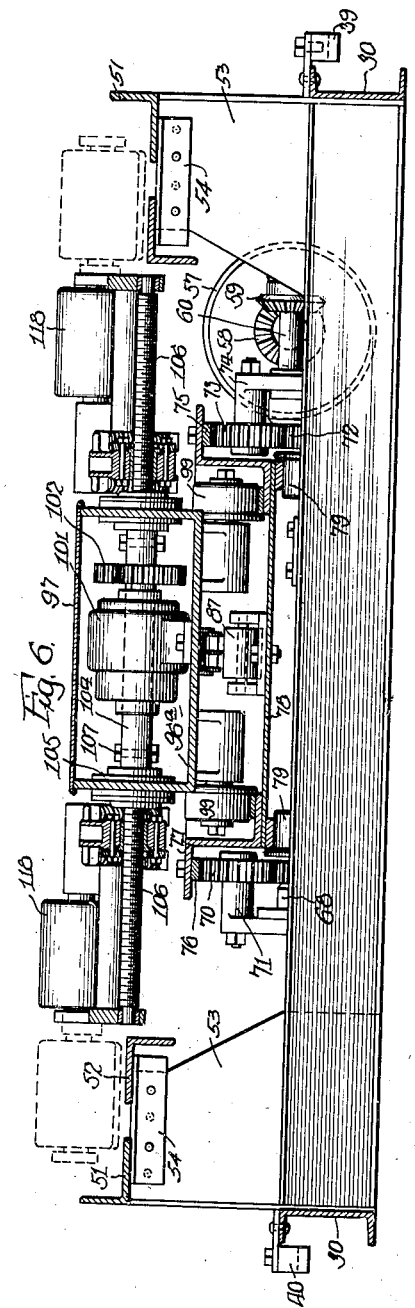
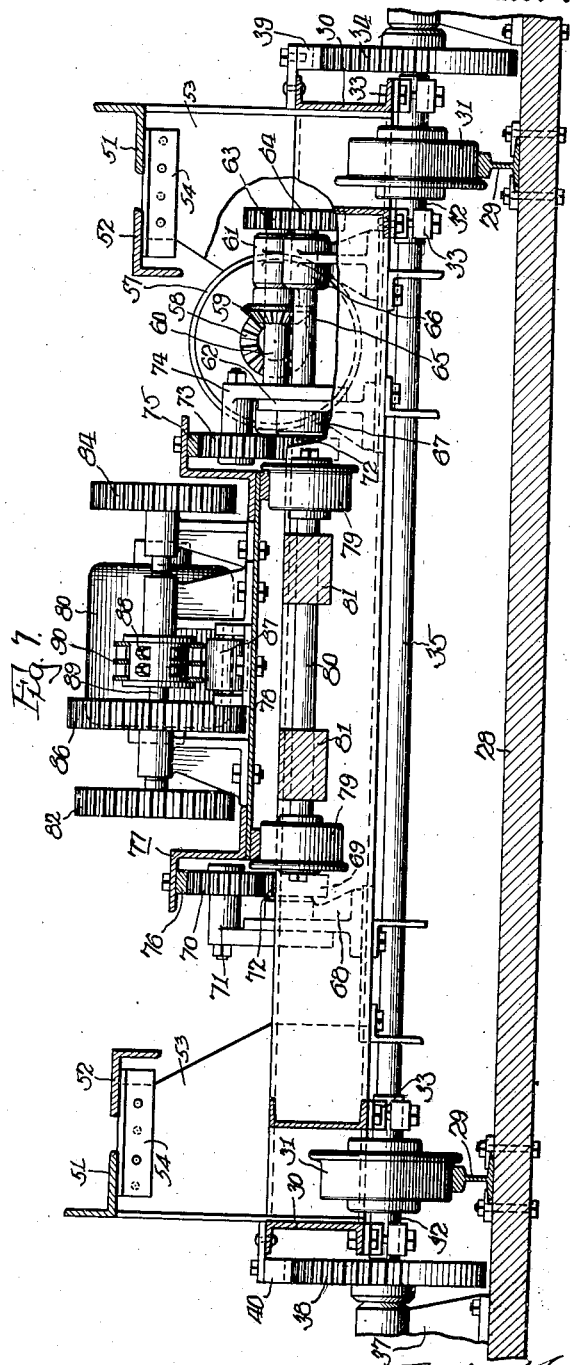
Inventors:
Samuel E. Buettell & Julius J. Gruenfeld
By John E. Gardner
Atty.

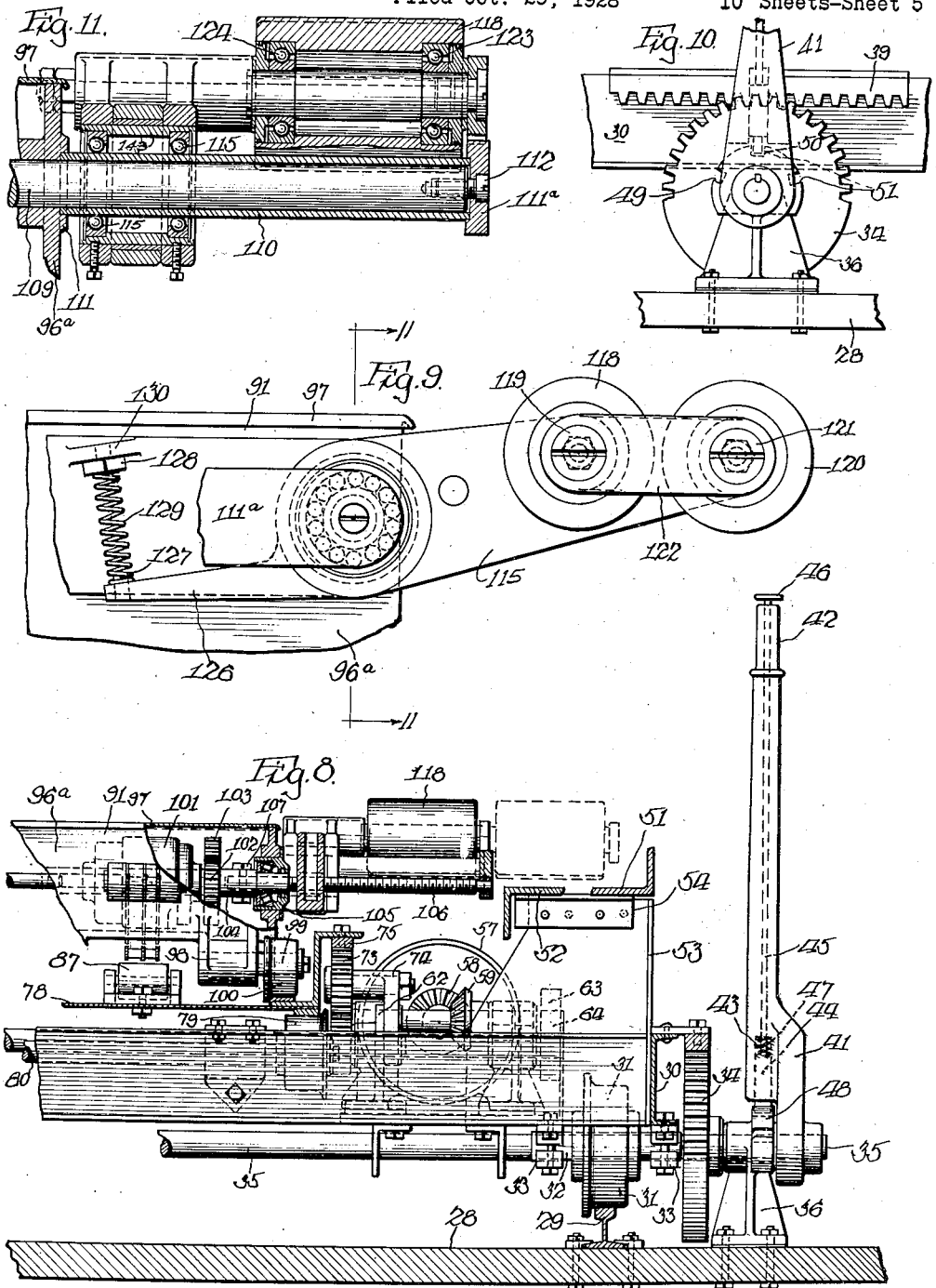

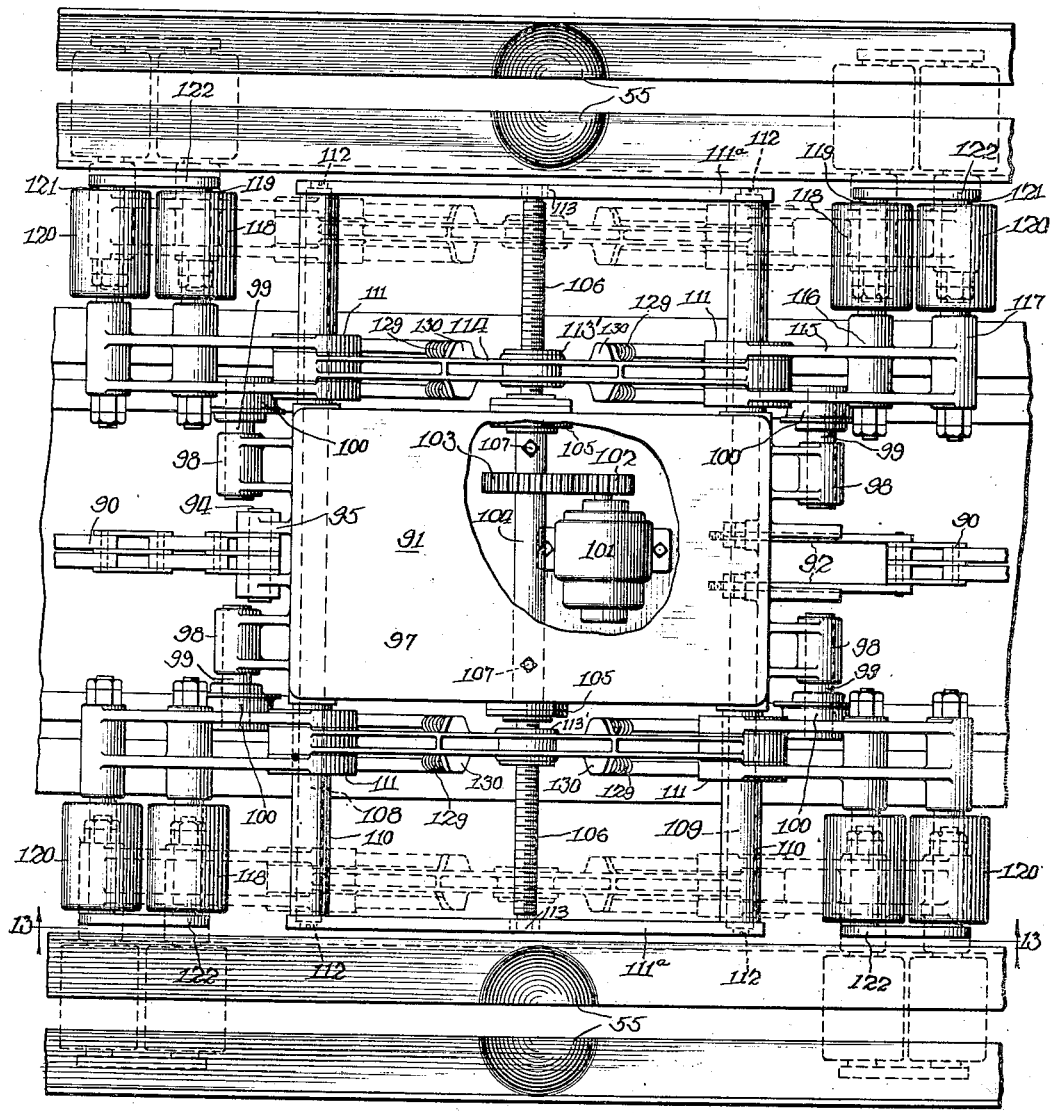

Nov. 28, 1933.   S. E. BUETTELL ET AL   1,937,189
VEHICLE STORAGE SYSTEM
Filed Oct. 29, 1928    10 Sheets-Sheet 7
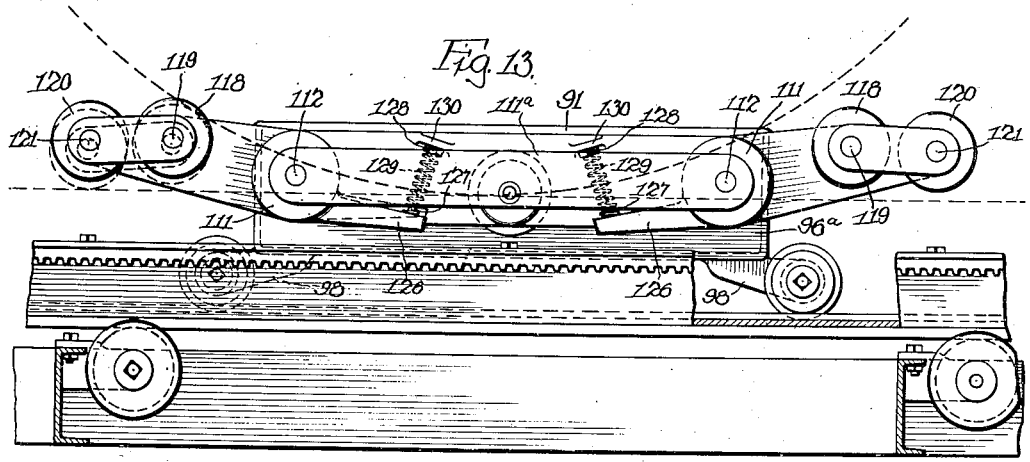
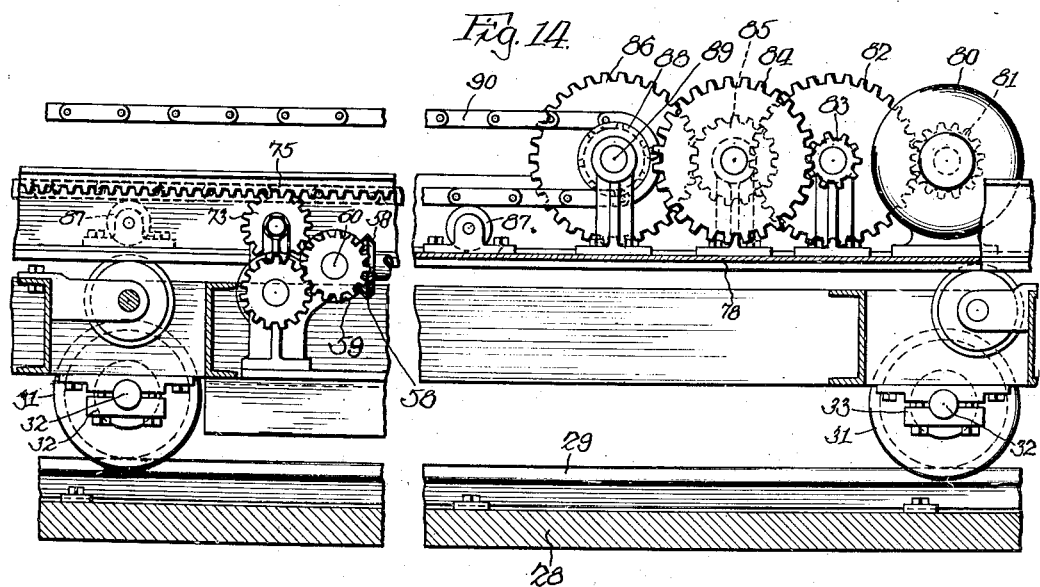
Inventors:
Samuel E. Buettell & Julius J. Gruenfeld
By John E. Gardner
Atty.

Nov. 28, 1933.  S. E. BUETTELL ET AL  1,937,189
VEHICLE STORAGE SYSTEM
Filed Oct. 29, 1928    10 Sheets-Sheet 8
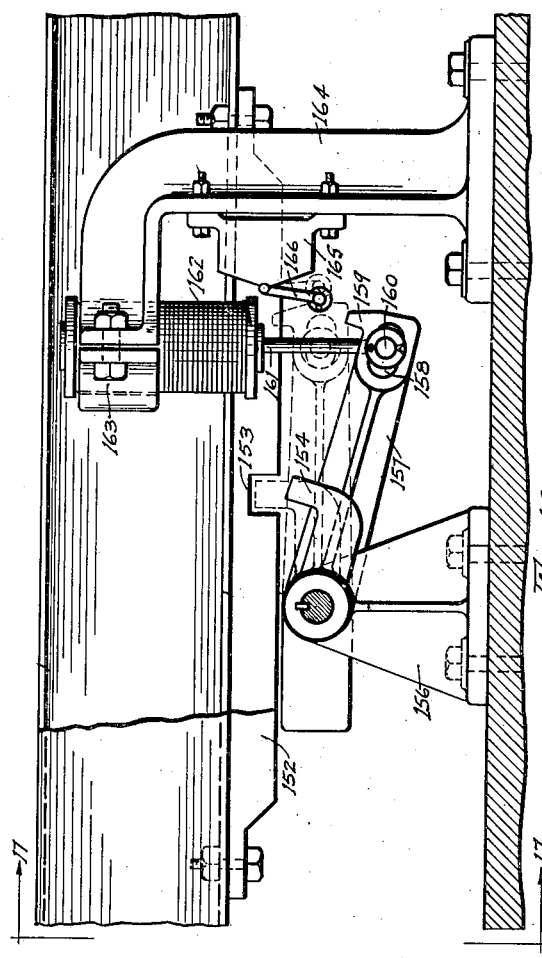
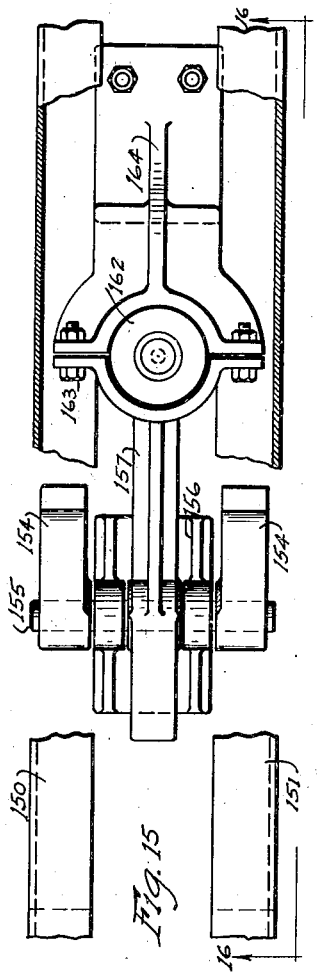
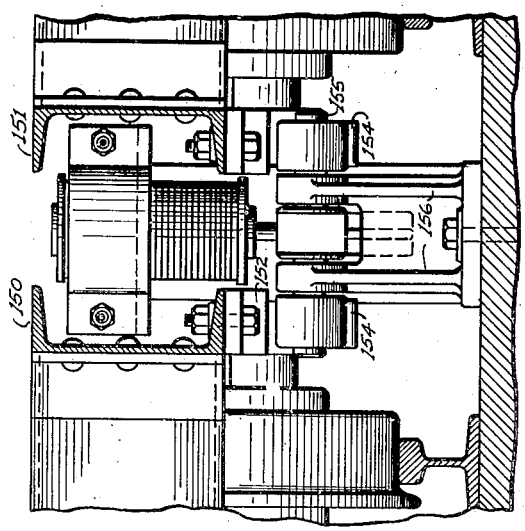
Inventors:-
Samuel E. Buettell
and Julius J. Gruenfeld
By John E. Gardner Atty.

Nov. 28, 1933.   S. E. BUETTELL ET AL   1,937,189
VEHICLE STORAGE SYSTEM
Filed Oct. 29, 1928   10 Sheets-Sheet 9

Inventors:-
Samuel E. Buettell
and Julius J. Gruenfeld
By John E. Gardner
   Atty.

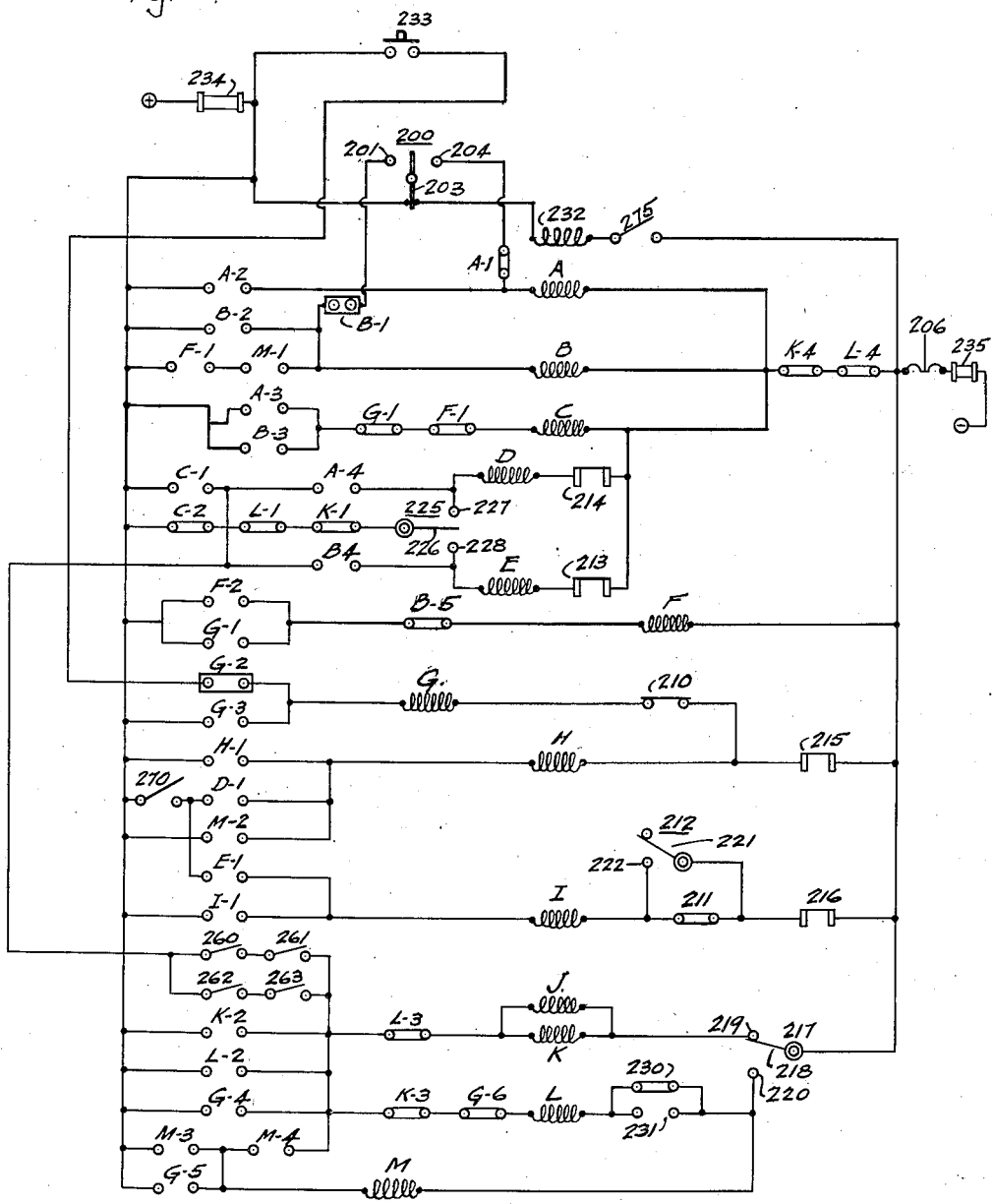

Patented Nov. 28, 1933

1,937,189

UNITED STATES PATENT OFFICE 1,937,189

VEHICLE STORAGE SYSTEM

Samuel E. Buettell and Julius J. Gruenfeld, Chicago, Ill., assignors to Cross Parking Systems, Inc., Chicago, Ill., a corporation of Illinois Application October 29, 1928. Serial No. 315,802

24 Claims. (Cl. 214—16.1)

The present invention relates in general to vehicle storage systems, and more particularly to so-called automatic garage structures, where vehicles are stored in a restricted space by machinery.

It is well understood that there is a growing demand for automobile storage structures to meet the automobile housing requirements in congested areas where property values are high. It is obvious that in such districts it is necessary to build a practical garage structure of the sky scraper type and provide vehicle handling equipment that will function efficiently in such structure. The usual manner of handling cars manually by driving them to storage spaces in the ordinary type of garage, or in the so-called ramp type, is rapidly becoming obsolete. A system of mechanically handling cars in storage structures of this type has been illustrated in the copending application of Samuel E. Buettell, Serial #272,169 filed April 23, 1928. This prior application discloses a system for handling vehicles in high buildings, which will meet all the building requirements of large cities, in addition to the insurance underwriter's requirements.

The present invention is in the nature of an improvement on this type of structure and its vehicle handling machinery.

One of the objects of the present invention is to provide vehicle handling machinery, which is particularly adapted for the sky scraper type buildings, running in height from ten stories upwards.

Another object is to provide an improved handling mechanism, which does not require a transverse movement, in order to handle a plurality of automobiles, and in which it is possible to simplify the vehicle handling mechanism considerably.

Another object is to provide vehicle handling mechanism that may be permanently associated with an elevator, and in which novel means are provided for bridging the gap from the elevator platform to the storage stalls on various floors.

Another object is to provide a novel construction, whereby it is possible to move the vehicles mechanically in a simpler and more positive manner and in which there is no likelihood of damaging the automobile or its attachments.

Another object is to provide a method for propelling this truck in a more positive manner, with relative simple mechanism at a reduced cost, from that illustrated in said prior application.

A still further object is to provide an improved mechanical construction for the vehicle moving truck, wherein the first cost, as well as the maintenance cost, is materially reduced.

A still further object is to provide an improved method for mechanically taking a car from a delivery station and storing it in any one of a plurality of stalls on different floors of a garage structure, and in taking it from one of the storage stalls to the delivery station.

There are other objects of our invention, which together with the foregoing, will be described more in detail in the specification which is to follow, taken in conjunction with the accompanying drawings.

In practising our invention, the type of garage structure employed, is preferably of the standard building construction extending in the air twenty stories or more. In this structure, we provide a plurality of elevators, and upon each elevator is mounted our improved vehicle handling mechanism. This mechanism comprises one or two vehicle moving units. In our studies we have determined that in metropolitan areas, where high speed operation is essential, one elevator can adequately handle approximately one-hundred cars, which gives a delivery and storage time of approximately one minute for each car. Thus, above thirty-five stories, it is desirable in many instances to employ only one vehicle handling unit on an elevator. In this instance, the elevator platform may be cut down to about half the size necessary, where two vehicle moving units are employed. However, since in the majority instances the buildings will be between twenty and thirty-five floors, I shall describe my invention, wherein two vehicle moving units are mounted on an elevator. It is, of course, obvious that in lower storage buildings of say from ten to twenty stories, that three of the vehicle moving units shown in this application might be mounted upon one elevator.

In the type of building in which two vehicle moving units are mounted upon a single elevator, the elevator can carry two cars at a time, either in the storing operation or the delivery operation. This is desirable in order to meet the peak load conditions, prevalent during rush hours. Each vehicle moving unit is adapted to take a car from a loading station on the ground floor, draw it on to the elevator, and when the elevator is raised to the proper floor, propel it into a vacant stall. In delivering a car, the operation is the same, though in reverse order. The provision of two vehicle handling mechanisms on a single elevator, enable the automobiles to be handled at a very high rate of speed, and during one movement of the elevator, two cars may be carried either up or down. This materially reduces the vehicle handling time, since in high buildings the majority of time consumed in the cycle of storing a vehicle is by the elevator travel. In addition, during ordinary conditions, the elevator will simply handle one vehicle at a time, however, during peak load conditions, there is reserve capacity, whereby two vehicles may be carried simultaneously and a great deal of time conserved. This mechanical method of handling automobiles renders an elaborate type of building unnecessary, since the load of stored vehicles is carried directly on the steel building structure. In addition, since the cars are mechanically handled, there is no danger of the vehicle becoming damaged in any way, and theft is entirely unknown. It is unnecessary to provide very much heating or lighting equipment above the first floor of the building and substantially no ventilation is necessary, because the automobile engines are not operated. Again the fire insurance rates on this type of building are very low, and in fact are comparable to those of ordinary fire-proof office buildings, because of the small number of cars stored on a single floor.

Referring now to the drawings:

Fig. 1 is a fragmentary ground floor plan of a garage structure of my invention;

Fig. 2 is a partial floor plan of one of the storage floors in the typical garage of Fig. 1;

Fig. 3 is a partial sectional elevation through the garage elevator hatch and vehicle handling mechanism on one of the elevators, showing the elevator with one of the vehicle handling units in position to place an automobile in storage or take it therefrom;

Fig. 4 is a plan of the elevator cage proper, showing the two vehicle handling mechanisms mounted on the elevator platform;

Fig. 5 is an elevation of the elevator platform and the vehicle moving mechanism of Fig. 4;

Fig. 6 is a section of the vehicle handling mechanism, along the line 6—6 of Fig. 4, looking in the direction of the arrows;

Fig. 7 is a sectional elevation of the vehicle moving mechanism along the line 7—7 of Fig. 4, looking in the direction of the arrows;

Fig. 8 is a fragmentary sectional elevation of the vehicle handling mechanism along the line 8—8 of Fig. 5, looking in the direction of the arrows and illustrating mechanical details thereof;

Fig. 9 is a side elevation of one of the vehicle wheel engaging rollers and its arms;

Fig. 10 is a detail of the carrier shifting mechanism;

Fig. 11 is a sectional elevation of one of the wheel engaging rollers, showing details of the operating mechanism thereof, and is taken along the line 11—11 of Fig. 9, looking in the direction of the arrows;

Fig. 12 is a plan of the transfer truck with its wheel engaging rollers that actually moves the automobile;

Fig. 13 is a side elevation of the transfer truck and its vehicle wheel engaging rollers;

Fig. 14 is a sectional elevation of the driving mechanism for driving the transfer truck and the transfer frame;

Fig. 15 is a plan view of an electromechanical lock used to prevent the movement of the automobile carrier while the elevator is in motion;

Fig. 16 is side elevation of the lock taken along the line 16—16 of Fig. 15;

Fig. 17 is an end elevation of the lock taken along line 17—17 of Fig. 16;

Fig. 21 is a conventional straight line wiring diagram of typical control circuits for operating one of the vehicle moving units.

Figure 18:
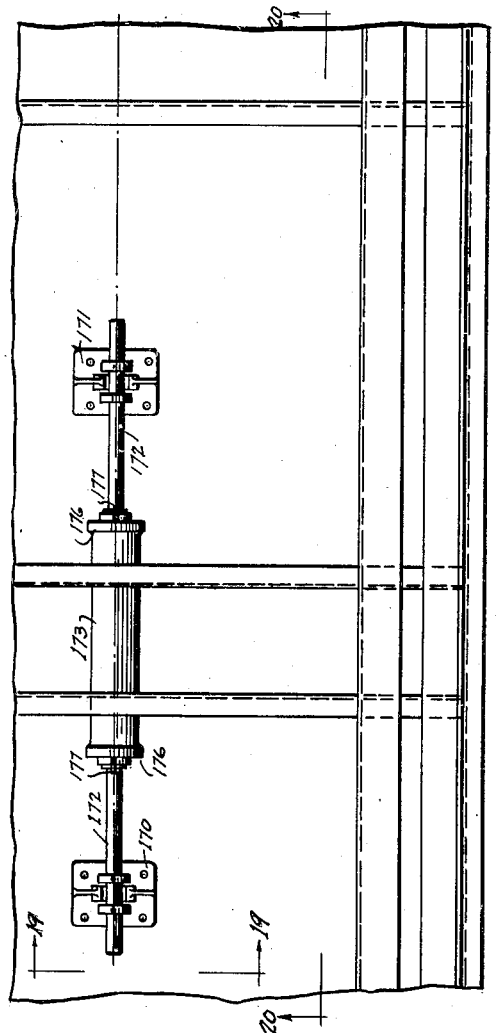
Fig. 18 is a plan view of an air cushioning device used to prevent severe shocks to automobile handling mechanism when extended towards the storage stall; the center line shown in this figure is center line of automobile carrier.

While in the drawings, our invention illustrates a garage structure having entrances on one side and exits on the other, it will be appreciated that it is not limited to a construction of this type, but may be applied to any form of garage, even those having exits and entrances on the same side. While only two elevators are shown, one or more may be obviously employed, depending upon the size of the plot that the garage is built on. It is also obvious that this garage structure may form part of a combination building, as for example, an office building, theatre or hotel.

A combination building of this type is desirable in many instances, and it is possible to obtain a much greater revenue of this type of structure and to plan desirable projects upon plots of ground that could not be practically handled in other ways.

In the accompanying drawings, like reference characters apply to similar parts throughout.

In Fig. 1 of the drawings, the typical garage structure shown is provided with entrances 16 and 17. The entrances open on a pair of driveways 18 and 19, that extend to an elevator, such as 20. Each elevator is shown as the two position type, that is, the height of the building is preferably between twenty and thirty-five floors. Automobiles entering into one of the entrances drive to the position before one of the elevators, under their own power, the automobile engine is then turned off and the car may be locked in any ordinary manner. The automobile is not moved under its own power until after delivery to the customer. Raised platforms 21 provide for properly aligning of the automobile wheels so that they are in a straight line and may be constructed as an integral part of the floor. Each of the entrances 16 and 17 may be provided with any usual type of garage door. Each elevator, such as 20, is of sufficient width in the present instances, so that two cars may be placed thereon. These elevators are preferably of the high speed type, capable of a vertical movement of approximately 500 feet per minute. This value is merely arbitrary and may be varied, as desired.

Exits 22 and 23 are provided at opposite sides of the building on the ground or loading floor and are fitted with suitable doors so that they may be operated in any desired manner. Raised platforms 21 constructed as an integral part of the floor serve to form guides for the vehicle wheels. The building is usually constructed so that there are waiting rooms, such as 24, in addition to accessory sales rooms, gasoline pumps, and the like. A fire tower 25 is usually provided, in order to give access to the various floors for fire protection, or other purposes.

From the plan of the ground floor, it will be seen that the vehicle handling mechanism on the elevator must be adapted to take a vehicle from either driveway 18 or 19 or both simultaneously, place it or them on the elevator and discharge it or them into one or two of the four storage floors, accessible to the elevator 20 on each floor, and to be able to take a vehicle from any one of the four storage stalls on any floor and deliver it at the delivery station. It will be appreciated that this construction may be modified somewhat. That is, the entrances or exits to the garage may be on different floors, for example, the entrances may be on the first floor, and the exits in the basement. However, the operation is substantially the same. Each of the elevators moves in a shaft or hatchway, which extends upward to the top of the building. A by-pass type of fire door is provided on either side of the elevator hatch on every floor, so that the elevator shafts are completely closed when the elevators are running. These fire doors do not have to be of the truckable sill type for reasons which will appear. The fire doors may be automatically operated if it desired. Loading pits 18′ and delivery pits 19′ are provided for the purpose of allowing the vehicle handling units to be projected beneath the car in the loading or delivery operation.

So far as the building construction is concerned, it is ordinarily the usual type of steel sky scraper construction, though reinforced concrete may be used. The individual storage stalls are made up of standard structural shapes, forming trackways adjacent to each other and arranged tier on tier. In the construction shown, there are two stalls provided on opposite sides of the elevator hatchway on each floor. The load of the stored vehicles is carried by the steel frame work of the building and the different tiers are separated each from the other by comparatively light floors, necessary for fire protection.

Fig. 2 illustrates a typical plan of one of the storage floors, showing each of the elevators, having access to four stalls 26, two on each side of the elevator hatchway. It will be understood that each of the storage stalls are of similar construction. Thus, the automobile handling mechanism on the elevator, since there are two vehicle moving mechanisms mounted thereon, must be capable of propelling a car into two stalls, one on either side of the elevator, or to withdraw a car therefrom. In this manner, the vehicle handling mechanism is capable of serving the four stalls accessible to one elevator on each floor.

The storage racks on the storage floors are made up of standard structural shapes spaced apart and mounted upon brackets so as to provide vehicle wheel guiding tracks, the weight of the vehicle being carried on the steel structure of the building. For a more detailed description of the construction of the storage racks, reference is made to the above cited copending application.

Fig. 3 is a sectional elevation of the elevator on the car handling mechanism, placing an automobile in the lower stall to the right, or about to withdraw a car therefrom. This car handling unit is as before stated, one of two mounted upon elevator platform 28. The elevator is provided with a pair of spaced apart rails 29 for each vehicle moving unit, thus there are four rails on the elevator platform. The car handling unit comprises a carrier frame 30 made up of standard structural shapes, suitably fastened together to form a rectangular structure. The carrier frame is supported on six wheels 31, a pair being positioned at either end of the frame and having a supporting pair in the middle. The wheels are suitably held in place by an axle 32 and adjustable split brackets 33 suitably attached to the carrier frame 30, Fig. 5. The wheels 31 may be of the roller bearing or any anti-friction type and are adapted to rotate about the axle 32. The carrier frame 30 is supported upon the wheels 32 in order that it may be given longitudinal or lengthwise movement of approximately nine inches to bridge the gap between the vehicle guiding tracks and the edge of the storage tracks. This longitudinal movement is accomplished by means of a gear 34, splined on a shaft 35, rotatably mounted in brackets or pedestals 36 on either side of the carrier frame 30, and at one end thereof. The brackets 36 are securely fastened to the platform 28 of the elevator. The shaft 35 extends beneath the carrier frame and is rotatably held in a bracket 37, also mounted upon the platform 28. This is the construction of the longitudinal carrier moving mechanism for one vehicle transferring unit. The other is somewhat different, as will be pointed out subsequently. A gear 38 is suitably keyed to the shaft 35 on the other side of the carrier frame 29, Fig. 7. The gears 34 and 38 mesh with racks 39 and 40 mounted upon the side structural members of the carrier frame 30. An operating lever 41 is suitably fixed to the shaft 35 and is shaped at its upper end to form a handle 42, Fig. 18. The lower end is provided with a socket 43 into which is fitted a pawl 44 to which is attached an operating rod 45. At the upper end of the rod 45 an operating button 46 is provided. A spiral spring 47 encloses the operating rod 45 and abuts the bottom of the socket 43 and the pawl member 44. The bracket 36 is provided with a cam surface 48, which is cast integral therewith. This cam surface 48 is provided with three notches 49, 50 and 51, Fig. 10, to cooperate with the operating pawl 44 and determine the three positions of the operating lever 41. It will be seen that the carrier may be shifted longitudinally by raising the operating button 46 against the tension of the spiral spring 47 and withdrawing the locking pawl 44 from the notch 50 in the cam surface 48. The lever 41 may now be operated in either direction to bring about the rotation of the gears 34 and 38, thereby driving the carrier frame through the racks 39 and 40 in either direction. A pair of vehicle wheel guiding tracks, each made up of two angles 51 and 52 suitably attached to bracket angles 53 are fixed to the carrier frame 30, Fig. 4. These vehicle wheel guiding tracks extend lengthwise of the elevator platform and serve to guide the wheels of the vehicle during its transferring movement from the elevator cage to the storage racks and vice-versa. The outer angle 51 of the wheel guiding track has its edge upstanding, while the inner angle has its edge extending downward, Fig. 6. These angles are spaced apart to form a guide for the automobile tires. A bracket angle 54 is provided for holding the track angles 51 and 52 together and serves to attach them permanently to the supporting bracket 53. A plurality of holes may be provided in both the brackets 53 and 54, for adjusting the spacing of vehicle wheel tracks, so as to obtain a mean spacing, to accommodate all wheel gauges of automobiles. Each of the brackets 51 and 52 forming the vehicle wheel guiding trackway has a concave depression 55 toward one end thereof to position the automobile suitably lengthwise of the carrier, Fig. 4. These depressions are designated by the reference character 55, Fig. 4. The depressions are so located that any car, irrespective of its overhand from either front or rear wheels, will be positioned on the carrier, so as to clear the elevator hatch. An operating unit comprising a motor 56 and a gear reducer 57 suitably coupled together, is fixed to the carrier frame 30 in any well known manner. A coupling brake 56' of any suitable construction may be provided. The gear reducer 57 serves its usual function of reducing the motor speed and drives a bevel gear 58 that meshes with the bevel gear 59, mounted upon the stub shaft 60, rotatably held in brackets 61 and 62, Fig. 7. The stub shaft 60 carries at its outer end a spur gear 62 that is adapted to mesh with the spur gear 63 mounted upon one end of a shaft 64 that is rotatably held in bearings 65 and 66 of brackets 61 and 62. The shaft 65 extends across the carrier frame 30 and is mounted in a bearing in the bracket 68 on the other side of the carrier frame. A spur gear 69 is keyed to the shaft 65 at a point adjacent to the bracket 68 and is adapted to mesh with the spur gear 70, rotatably mounted upon the adjustable bracket 71. A spur gear 72 is keyed to the shaft 65 at a point adjacent the bracket 68 and is adapted to mesh with a spur gear 73 rotatably mounted on the adjustable bracket 74. The gears 70 and 73 are adapted to mesh with racks 75 and 76 suitably mounted on the transfer frame 77 and extending the full length thereof.

It will thus be seen that the transfer frame 77 is adapted to be driven by the spur gears 70 or 73 from both sides, so that there is no tortional strain due to uneven pressure on the automobile tires. The spur gears 70 and 73 are rotatably mounted on the adjusted brackets 71 and 74 in order that any inequalities between the respective gears and racks may be compensated for, when the units are assembled. In addition the gears may be disengaged from the racks if it is necessary at any time to move the equipment by hand through failure of the electrical equipment.

The transfer frame 77 is made up of a standard structural shapes, suitably fastened together to form a rectangular shaped structure. On the lower side of this structure, there is bolted a bed plate 78, which extends the full length thereof. The transfer frame 77 rests upon ten roller bearing wheels 79 in five pairs, spaced the length of the carrier frame. These wheels are rotatably mounted upon axles 80, held in suitable brackets 81, mounted upon the carrier frame, Fig. 7. The weight of the transfer frame 77 is thus distributed on these rollers bearing wheels and moves very easily into extended position, as will appear. A transfer truck operating mechanism comprising a motor 80 and suitable speed reducing mechanism consisting of the spur gears 81, 82, 83, 84, 85 and 86 are mounted upon the end of the transfer frame 77 in any suitable manner, Figs. 4 and 14. A plurality of idler rollers 87 of any desired construction are mounted upon the transfer frame 77 at spaced apart intervals, Fig. 4. A sprocket 88 is splined to a shaft 89 that carries the spur gear 86 and is adapted to drive a chain 90, one end of which is attached to the transfer truck 91, by an adjusting bracket 92 of any suitable construction. The chain 90 passes around idler sprocket 93 at the opposite end of the transfer frame and is permanently attached to the transfer truck 91 by a pin 94 passing through the bracket 95. The idler rollers 87 serve to space the lower portion of the chain and keep it from engaging the platform or bed plate 78 of the transfer frame. A pair of rails 95a and 96 are spaced apart and suitably fastened to the transfer frame 77 and extend the full length thereof, Fig. 4. These rails serve to guide the transfer truck 91. The transfer truck 91 is a steel casting 96a of box-like shape and is provided with a water-proof cover 97. The steel casting 96a is provided with four extension brackets 98 which provide mountings for shafts 99 of anti-friction bearing wheels 100. A small motor 101 is suitably mounted in the steel casting and drives a spur gear 102 that meshes with a spur gear 103 splined to a sleeve 104 rotatably held in bearings 105 in the steel casting 96a, Fig. 12. Two stub screw shafts 106 are pinned in the rotary sleeve 104 by means of pins 107. A number of holes are provided in the screw shafts 106 in order to provide an adjustment as to the length of the shafts and the consequent extension of the rollers in the event that the wheel gauge of automobiles should be materially changed in the course of time. A pair of shafts 108 and 109 extending through the steel casting 96a and to either side thereof, are suitably fixed in bosses at the four corners of the steel casting 96a. A case hardened sleeve 110 encloses each end of the shafts 108 and 109 and is held in place between bosses 111 on the steel casting 96a and the end plate 111a by counter sunk screws 112 tapped in end of the shafts 109. The end plate 111a extends across the full length of the truck and serves to brace the ends of the two steel shafts 109 at each corner on one side of the truck, as well as to hold the tubular hardened bearing members 110 surrounding shafts 109 in place. In addition the end of the screw shaft 106 on each side is reduced so as to fit in an opening 113 in the end plates 111a. In this manner, the end plate 111a serves to brace the screw shaft 106 and the bearing members 110. A nut 113' is threaded on each screw member 106 and is an integral part of the roller arm spreaders 114 which are of the construction illustrated in Fig. 12. The roller arm spreaders are provided with two bosses 130, which supply supports for the springs 129. Each end of each roller arm spreader has an opening therein adapted to pass over the tubular sleeve 110. The roller bracket member 115 is fork-like construction and is provided with two spaced apart bosses 116 and 117 at one end thereof, and the other end is also provided with a boss 111, and has an opening therein so as to adapt it to slip over the sleeve member 110. A ball bearing 143 housing two ball bearing races 115, the balls of which are adapted to contact with the outside of the sleeve 110, the surface of which has been hardened as before mentioned, to provide a bearing surface, Fig. 11. The housing 143 thus serves to connect the roller arm bracket 115 to the roller arm spreader 114, to provide a bearing that will permit the roller arm to spread the rollers with very little friction, and also to provide a bearing that will permit rotary movement of the roller arm bracket 115. The roller arm bracket 115 has an extension 126 at one end thereof and a spring 129 encloses a bolt 127 that extends upwards through an opening in the boss 130 of the roller arm spreader 114, Fig. 9. A nut 128 is threaded on the bolt 127 in order to provide for adjusting tension of the spring 129. The helical compression spring 129 serves to maintain roller arm bracket 115 carrying the roller 118 and 120 in normal position, at the same time, permitting the roller bracket 115 to be pushed down either to escape an obstruction on the vehicle or to accommodate itself to variations to floor level, as will appear. Two rollers 118 and 120 are fitted on shafts 119 and 121 extending through openings in the bosses 116 and 117 by suitable anti-friction bearings 123 and 124, Fig. 11. An end plate 122 is suitably fastened to the shafts 119 and 121, respectively. In this manner a pair of rollers are attached to each end of the roller arm spreaders 114, so that on the truck 91, there are four pairs of rollers. It will be seen that by the operation of the motor 101 the shafts 106 are rotated through the spur gears 102 and 103 and the spreader arms 114 are moved in or out on the screw shafts 106, depending upon the direction of the rotation of the motor. Fig. 12 illustrates the normal position of the spreader arms 114 and the rollers, while the dotted lines indicate their extended position where the rollers 118 and 120 extend over the trackways, comprising the angles 51 and 52.

As has been stated before, one of the operating levers 41 is adapted through the mechanism described to extend one of the carrier frames longitudinally a short distance in either direction to span the gap across the elevator hatch. The other lever 41 is adapted to perform a similar function with respect to the other vehicle carrier. It will be noted that both levers are mounted in a line at the side of one carrier, Figs. 3 and 4, thus the shaft of one of the levers is extended and held in a bracket similar to the bracket 36 in order to avoid mounting one of the levers between two carrier frames.

It will be seen that there must be some provision so as to prevent movement of either carrier by means of levers 41 either accidentally or intentionally during the time the elevator is moving in the hatch. This is accomplished by the locking mechanism illustrated in Figs. 15, 16 and 17. On the under side of each carrier frame and to one of the structural members 150 and 151 thereof, there is mounted cams or locking members 152. These members are about 20 inches long, since the movement of the carrier frame is about 8½ inches in either direction, in order to span the gap. At the center of each of the members 152, there is provided a cut-away portion 153 into which a locking dog 154 is adapted to project. The two locking dogs 154 are suitably splined to a shaft 155 rotatably supported in the bracket 156. An operating member 157 is also secured to the shaft 156 and is provided with an oval shaped opening 158 at its end and a cam projection 159. The bracket 156 is suitably attached to the elevator floor, at such position that when the shaft 155 is rotated, the locking dogs will fit in the openings 153 on each of the members 152 attached to the two carrier frames. A pin 160 suitably attached to the operating member 161 of the solenoid magnet 162 projects through the opening 158 in the operating member 157. The solenoid magnet 162 is held by means of a bracket 163 attached to the supporting bracket 164. The supporting bracket 164 is secured to the elevator platform 28. The supporting bracket 164 also carries a switch 165, having an operating arm 166 attached thereto. It will be seen that when the magnet 162 is energized the plunger is attracted and the operating arm 161 bring the two locking dogs 154 into the holes 153 in the locking members 152, provided the carrier frames are centered on the elevator platform. Unless the carrier frames are so centered the locking dogs prevent the operation of the operating member 157. The cam surface 159 of the operating member 157 operates the operating member 166 of the switch 165. This switch controls the elevator operation in a manner that will appear when the electrical circuits are discussed. The hole 158 is oval shaped in order to permit the rotary movement of the operating member 157 as a result of the vertical movement of the plunger arm 161 of the magnet 162. It will be seen that when the magnet is energized and the locking dogs 154 are in position, it is impossible to move either carrier frame by means of the operating levers 41, either accidentally or intentionally. Also unless the magnet 162 is energized and the locking dogs in position, the switch 165 is not operated.

Figure 20:
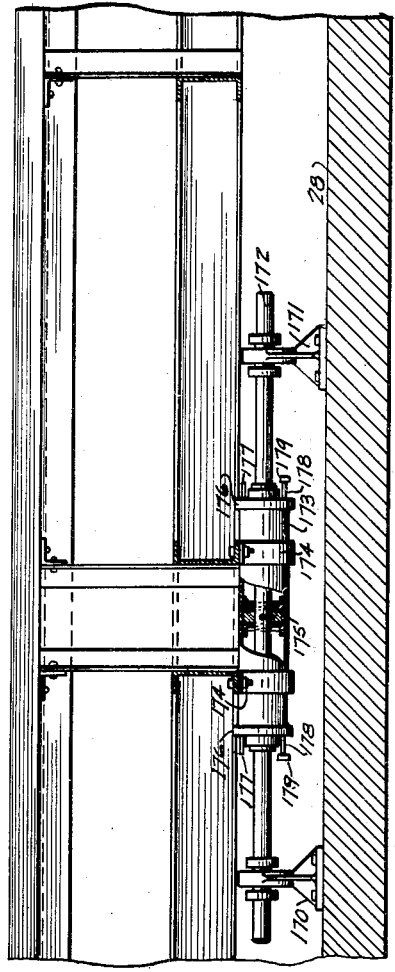
Fig. 20 is side elevation of same along lines 20—20 of Fig. 18.
Figure 19:
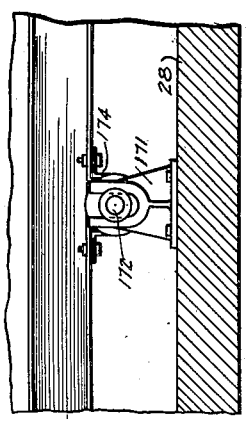
Fig. 19 is end elevation of same along lines 19—19 of Fig. 18.

It will be appreciated that since the carrier frames are mounted on anti-friction bearing wheels, that considerable momentum may be obtained when either frames start moving by the operation of the associated lever 41. In order to govern this longitudinal movement a pneumatic breaking device or cushion is provided for each carrier. This may be seen in Figs. 18, 19 and 20. Below each carrier frame, there is mounted two brackets 170 and 171 on the elevator platform. These brackets serve to support a shaft 172 which extends through an air cylinder 173 suitably fixed by means of bands 174 to the under side of the carrier frame. A piston member 175 is fixed to the shaft 172 in any desired manner and works inside the cylinder 173. This piston member 175 thus divides the cylinder 173 into two compartments. The end plates 176 of the cylinder 173 are each provided with a breather or inlet valve 177 and an adjustable outlet valve 178. The openings of the outlet valve 178 may be adjusted by the member 179. It will be seen that when the carrier is moved in either direction, that air is forced out through one of the outlet valves 178 and taken in through the inlet valve at the opposite end of the cylinder. The compression of this air by movement of the carrier frame serves to regulate its movement and provide an air cushion so that there is no strain on the apparatus. The movement of the carrier in the opposite direction has a similar effect. Thus this air piston arrangement regulates and controls the movement of the carrier frame so that the operator cannot cause damage to the vehicle moving mechanism by negligently operating the lever 41.

There is one of these pneumatic control devices under each carrier frame, so as to control its movement. A point to be noted is that this pneumatic control is exercised on the movement of the carrier in either direction and may be regulated to meet the required conditions.

Having described the mechanical construction of my invention, I shall now explain its operation and the typical electrical circuits for securing this operation, with reference to Fig. 21.

It will first be assumed that a car drives into the garage through the entrance 16, along the pathway 18 and is brought to rest before the elevator 20, upon which is mounted the two vehicle moving units. The automobile is positioned directly before one of these vehicle moving units, the raised platforms 21 cooperating to aline the vehicle wheels properly. In order to bring about the transfer of the vehicle from the loading station on to the vehicle moving unit, the elevator operator will throw one of the levers 41, which will shift the carrier frame 30 lengthwise to close the gap between the elevator wheel tracks, comprising the angles 50 and 51, and wheel tracks in the loading pit 18', Fig. 3. In order to move the lever 41, the button 46 is raised thereby raising the pawl 44 and withdrawing it from engagement with the locking cam 48.

The lever 41 may now be moved to accomplish the shifting of the carrier frame 30, since the magnet 162 is deenergized and the locking pawls 154 are not in position, through the rotation of the gears 34 and 38 engaging the racks 39 and 40. When the carrier 30 has been shifted the button 46 is released to permit the locking pawl 44 to enter the hole 51 in the cam and lock the carrier in the extended position. This movement of the lever 41 brings the contact making member 203 into engagement with the contact member 204 whereby a circuit is completed from the positive side of the line, contact making member 203, contact member 201, normally closed contacts A—1, relay A, normally closed contacts K—4 and normally closed contacts L—4, emergency stop switch 206 and fuse 235, to the negative side of the line. The relay A is energized over this circuit and operates to establish a locking circuit for itself at the contacts A—2 and to open its original energizing circuit at the contacts A—1. Another result of the operation of the relay A is that the contacts A—3 are closed whereby a circuit is completed from the positive side of the line, fuse 234, contacts A—3, normally closed contacts G—1, normally closed contacts F—1, relay C, normally closed contacts K—4, normally closed contacts L—4, emergency stop switch 206 and fuse 235 to the negative side of the line. The relay C is a time element relay and is energized over this circuit, and operates after a short interval of time to complete a circuit for the relay D over a path that may be traced from the positive side of the line, fuse 234, contacts C—1, contacts A—4, relay D, limit switch 213 and thence over the previously traced circuit to the negative side of the line. The relay D is operated to complete a circuit for the motor 56 in such direction as to extend the transfer frame 77 through the speed reducing mechanism 57, the gears 58 and 59 and the pinions 70 and 73 and racks 75 and 76 attached to the under side of the frame. By this operation the transfer frame 77 is extended into the loading pit 18' below and between the front wheels of the automobile. By the operation of the relay D, there is a circuit completed, which extends from the positive side of the line, contacts D—1, relay H, limit switch 215, emergency stop switch 206 and fuse 235, to the negative side of the line. The relay H is energized over this circuit and operates the motor 80 to drive the chain 90 through the speed reducing gears 81, 82, 83, 84, 85 and sprocket 88. By the operation of the motor 80, the truck 91 is properly positioned at the end of the transfer frame. When this occurs, the limit switch 15 is operated so as to open the circuit of the relay H. Relay H is deenergized to open its locking circuit at the contacts H—1. When the transfer frame is extended into proper position, the limit switch 214 is operated to open the circuit of the relay D. The relay D is deenergized to open the circuit of the motor 56 and the brake 56' is operated to stop the movement of the transfer frame. The speed of the motor 80 is such as to drive the transfer truck to its outward limit, before the transfer frame motor 56 has extended the transfer frame 77 to its outward position in the loading pit. The switch 260 is closed when the transfer frame is extended into its furthermost position in one direction and the switch 262 is closed when the transfer frame is extended into its furthermost position in the opposite direction. The switch 261 is closed when the transfer truck is extended into its furthermost position in one direction and the switch 263 is closed when the transfer truck is in its furthermost position in the opposite direction. The switch 231 is on the transfer frame and is operated by a trigger switch located in the loading pit if the wheel of the vehicle is properly positioned therein, the switch 230 having been opened at the loading floor by the operation of a door cam. For disclosure of this trigger switch 231 and the door cam switch 230 reference made to the copending application of S. E. Buettell, Serial #272,169, filed April 23, 1928. The switch 217 has its contact making member 218 in engagement with the contact making member 220 since the roller arms or roller arm spreaders are in their normal or unextended position. A circuit is now completed for the relay L over a path that may be traced from the positive side of the line, fuse 234, contacts C—1, switch 260, switch 261, normally closed contacts K—3, normally closed contacts G—6, relay L, contacts of switch 231, contact member 220, contact making member 218, emergency switch 206 and fuse 235 to the negative side of the line. The relay L is energized to complete a circuit for the motor 101 in such direction as to bring about the extension of the roller arm spreaders 114 so that the rollers 118 and 120 are extended to a position on either side of the front wheels of the automobile. When in this position the switch 217 is operated so that its contact making member 218 is swung into engagement with the contact member 219, whereby the relay L is deenergized to open the circuit of the motor 101. When the relay L is operated the circuit of the relays A and C is opened at the contacts L—4. The relay C is deenergized to open the original energizing circuit of the relay L, the relay L being maintained energized until the roller arms are completely spread because of its locking circuit at its contact L—2, and to open the original circuit for the relay D. When the transfer frame is extended in one direction the switch 225 has its contact making member 226 in engagement with its contact member 228. Now when the relay L is deenergized, there is a circuit completed, which extends from the positive side of the line, fuse 234, contacts C—2, contacts L—1, contacts K—1, contact making member 226, contact member 227, relay E, limit switch 214, contacts K—4, contacts L—4, emergency stop switch 206, and fuse 235 to the negative side of the line. The limit switch 214 is adapted to be operated when the transfer frame is extended into position on the positive side of the elevator hatch from the loading position. The relay E is operated to complete a circuit for the motor 56 in such direction that the transfer frame 77 is moved on to the elevator. The operation of the usual accelerator closes the contacts of the switch 270 and there is a circuit completed by way of these contacts, contacts E—1, relay I, contact member 222 of switch 212, contact making member 221, limit switch 216 and thence to the negative side of the line. The limit switch 216 is operated when the transfer truck 91 reaches its furthermost position at the opposite end of the transfer frame. The switch 212 remains with its contact making member 221 in engagement with its contact member 222 until the transfer truck passes its middle position on the transfer frame when these contacts are opened. The switch 211 is placed in the opening between angles 51 and 52 in the depression 55 and is adapted to be operated by the vehicle wheels. For a mechanical description of this switch and its operation, reference is made to the above cited copending application. The relay I is energized to complete a circuit for the motor 80 in such direction as to bring about the movement of the transfer truck 91 towards the other end of the transfer frame. The movement of the transfer frame 77 and the transfer truck 91 cooperate to move the vehicle on to the carrier, the vehicle wheels being guided by the tracks made up of the angles 51 and 52. It is to be noted that when the front wheels of the vehicle engage the switch 211, its opening has no effect since the circuit of the relay I passes through the switch 212. However, when the transfer truck 91 passes its center position, the switch 212 is opened and when the rear vehicle wheels rest in the depressions 55, the opening of the switch 211 opens the circuit of the relay I and consequently the circuit of the motor 80 which operates the transfer truck 91. It will be noted that since the circuit of the transfer truck motor 80 is not closed until the accelerator of the transfer frame motor 56 operates, the transfer frame overcomes the inertia of the vehicle and starts it moving. The transfer truck motor 80 is then cut in and the speed of movement of the vehicle is increased since the transfer truck motor is adapted to move the transfer truck considerably faster than the transfer frame is moved and the relay I is deenergized to bring about the denergization of the transfer truck motor 80 before the transfer frame motor 56 stops. This slows down the movement of the car and absorbs some of its momentum. It will be seen that when the transfer truck is moving the vehicle in cooperation with the transfer frame, the outside roller 120 is depressed and rides along the vehicle track while the inside roller 118 engages the vehicle wheel and is rotated thereby. The roller on the other side of the vehicle wheel serves merely to hold the vehicle and prevent it from running away. The vehicle is thus rolled along the tracks, the transfer truck furnishing the roller power in conjunction with the transfer frame, Fig. 13. If the brakes are set on the vehicle wheels that are being rolled the weight of the car is maintained on the inside roller 118 and the load is rolled on the roller 120 or outside rollers on each wheel. This construction employing double rollers permits the vehicle to be moved with a minimum application of power, even though the brakes be set or the tires fall. By the use of the double roller, it is also very easy for the motor 101 to withdraw the rollers from the wheel, even though the brakes on the car are set.

When the transfer frame 77 reaches its center position, the switch 225 is operated to swing its contact making member 226 into center position, thereby opening the circuit of the relay E. The relay E is deenergized to open the circuit of the motor 56 and complete a circuit for the brake 56'. The vehicle has now been loaded on the carrier frame and is in normal position. The elevator operator will now operate the lever 42 by raising the button 46 to withdraw the cam 44 from locking engagement with the opening 51 and move the carrier frame through the gears 34 and 38 and the racks 39 and 40 to its normal position whereupon he will release the button 46 to permit the locking pawl 44 to enter the opening 50 under pressure of the spring 43. The cam member 153 is now in position with its openings 153, properly alined with the locking pawls 154.

The operator may now place the vehicle in one of two stalls on any floor. The operation will first be described when the operator desires to place a vehicle in a stall located on the same side of the building as the entrance. In this operation, it is only necessary to bring the elevator to a proper floor in any well known manner. As soon as the elevator is started the contacts of the switch 275 are closed a circuit is completed for the relay 232. The relay 232 is energized to close a circuit of the magnet 162, Fig. 16. The magnet 162 is energized to operate its plunger 161, thereby swinging the locking pawls 154 into the openings 153 in the locking members 152 attached to the carrier frames. The carrier frames cannot be moved during the time that the elevator is running. The cam 159 on the operating member 157 serves to operate the switch 165, which initiates the operation of the elevator. When the elevator is brought to the proper floor and leveled thereat either automatically or otherwise, the contacts 275 are opened to bring about the deenergization of the relay 232 and the relay 162. The relay 162 deenergizes to withdraw the locking pawls 154 from engagement with the carrier frames. The switch 165 is restored to its normal position so the elevator cannot be operated. The vehicle may now be shifted or transferred into the storage stall with which it is alined on the same side of the building as the entrance. Another function of the switch 165 is that should the circuit of the magnet 162 be opened at any time, the operating member 157 will assume its normal position and the switch 165 will be opened to stop the elevator. This is a safety device, which absolutely prevents any injury to the automobile or vehicle handling apparatus, either accidentally or by intentional handling by the elevator operator.

In order to shift the car into the proper stall after the elevator has stopped, the operator will move the lever 41 so as to shift the carrier 30 to close the gap between the elevator hatch and the storage stall. The movement of the lever 41 in addition to closing the gap in a manner similar to that already described, brings the contact making member 203 into engagement with contact member 204, thereby completing a circuit for the relay A in a manner that has been described. The relay A is energized to complete a locking circuit for itself and to open its original energizing circuit at its contacts A—1. The operation of the relay A serves to complete a circuit for the relay C by way of the contacts A—3. The relay C is energized after a short interval of time to complete a circuit for the relay D. The relay D is operated to energize the transfer frame motor 56 so as to drive the transfer frame 77 into the proper storage stall by mechanism already described.

By the operation of the accelerator the switch 270 is closed, thereby completing a circuit through the contacts D—1 for the relay H. The relay H is operated to complete a circuit for the transfer truck motor 80 in such direction as to bring about the movement of the transfer truck 91 toward the end of the transfer frame. The transfer frame 77 and transfer truck 91 cooperate to roll the vehicle along the carrier wheel tracks into the vehicle storage stall. When the transfer truck reaches its limit of movement on the transfer frame the limit switch 215 is operated to bring about the deenergization of the relay H to open the circuit of the motor 80. When the transfer frame reaches its limit of movement the switch 214 is operated to open the circuit of the relay D, thereby energizing the motor 56. The automobile is now properly positioned on the vehicle stall racks with its wheels resting in the depressions therein. When the transfer frame and transfer truck are in this position, there is a circuit completed, which extends by way of the switches 260 and 261 over a path from the positive side of the line, fuse 234, contacts C—1, switch 260, switch 261, contacts L—3, relays J and K in parallel, contact making member 218, emergency stop switch 206 and fuse 235 to the negative side of the line. The relays J and K are energized, the relay J being a time interval relay. When both these relays are energized, there is a circuit completed for the transfer truck motor 101, so as to bring about the rotation of this motor in such direction so as to withdraw the rollers from either side of the vehicle wheels. The relay K operates to establish a locking circuit for itself at the contacts K—2. Another result of the operation of the relay K is that the circuit of the relays A and C are opened and these relays are deenergized. Now when the roller arm spreaders reach their normal position on the transfer truck the switch 217 is operated so as to swing the contact making member 218 into engagement with the contact member 220, thus opening the circuit of the relays J and K. The deenergization of these latter relays open the circuit of the motor 101. A circuit is now completed when the relay K is deenergized, which may be tracked from the positive side of the line, contacts C—2, contacts L—1, contacts K—1, contact making member 226, contact member 228, relay E, limit switch 213, contacts K—4, contact L—4, emergency stop switch 206 and fuse 235 to the negative side of the line. The relay E is energized over this circuit and operates to bring about the energization of the motor 56, so as to withdraw the transfer frame 77 from its extended position in the stall to its normal position in the frame, through mechanism already described. When the transfer frame reaches its normal position the switch 225 is operated to open the circuit of the relay E, and this relay is deenergized to open the circuit of the motor 56.

The elevator operator may now return the carrier frame to its normal position by movement of the lever 41 in a manner already described. When the carrier is properly positioned on the elevator, the elevator may be returned to the loading floor.

It will be appreciated that automatic mechanism is preferably employed to bring about the elevator operation and to effect the opening and closing of the doors to the proper stalls at the desired floors. The preferable practice is to provide in the two position or two carrier elevator, a door on each side of the hatch so that one door will serve two stalls. The circuits for controlling the elevator and door operation have not been shown as any ordinary or usual type may be employed.

The operation in obtaining a car from storage and delivering it occurs in a similar manner to that already described and is thought to be obvious.

It will now be assumed that when a car is loaded on the carrier at the loading station in the manner described that it is desired to store it in a storage stall on the opposite side of the elevator hatch from that where it was received. In order to accomplish this result, it is necessary to reposition the transfer truck so that instead of it being engaged and having control of the front wheels of the vehicle, it will have control of the rear wheels. In order to conserve time it is desirable that this repositioning of the truck occur during the vertical movement of the elevator. When the elevator is started to its proper destination in the manner described the operator will press the push button 233, thereby completing a circuit extending from the positive side of the line, fuse 234, push button 233, contacts G—2, relay G, switch 210, limit switch 215, emergency stop switch 206, and fuse 235 to the negative side of the line. The switch 210 is operated by the vehicle wheel resting in the depressions 55 in the vehicle wheel tracks of the carrier frame. The relay G is thereupon energized to open its original energizing circuit at the contacts G—2, and to establish a locking circuit for itself at the contacts G—3. A circuit is now completed which extends from the positive side of the line, fuse 234, contacts G—4, contacts L—3, relay J and K in parallel, contact member 219 of switch 217, contact making member 218, emergency stop switch 206 and fuse 235 to the negative side of the line. The relays J and K are energized to complete a circuit for the motor 101 which is operated to retract the rollers to their normal unextended position. When the rollers are in their normal position, the circuit of the relays J and K is opened at the switch 217 and these relays are deenergized to open the circuit of the motor 101. By the operation of the contact making member 128 of the switch 217 in engagement with the contact 220, there is a circuit completed for the relay M. The relay M is operated to establish a locking circuit for itself, at the contacts M—3. Another result of the operation of the relay M is that there is a circuit completed for the relay H at the contacts M—1. The relay H is energized to establish a locking circuit for itself at the contacts H—1 and to complete a circuit for a motor 80 of the transfer truck to drive it toward the rear wheels of the vehicle. When the transfer truck reaches its limit of movement on the transfer frame, the limit switch 215 is opened, thereby opening the circuit of the relays H and G. The transfer truck is now positioned so that its rollers are adjacent the rear wheels of the vehicle, since these rear wheels of the vehicle have been stopped in a predetermined position when the vehicle was loaded by the operation of the switches 211 and 212 as previously described. The relay H is deenergized to open the circuit of the motor 80. The relay G is deenergized to open the original energizing circuit of relay M. The deenergization of the relay G completes a circuit at the contacts G—6 for the relay L. This circuit may be traced from the positive side of the line, fuse 234, contacts M—3, contacts M—4, contacts K—3, contacts G—6, relay L, switch 230, contact member 220, contact making member 218, emergency stop switch 206 and fuse 235 to the negative side of the line. The relay L is energized to bring about the operation of the motor 101 so as to extend the rollers 118 and 120 on either side of the rear wheels of the vehicle. Now when the elevator stops at the desired floor and the door on the proper side of the elevator has opened, the elevator operator will move the lever 41 so as to move the carrier frame longitudinally to span the gap between the elevator platform and the stall racks in the same manner as described. However, the movement of this carrier frame is opposite to that previously explained. This operation brings the contact making member 203 of the switch 200 into engagement of the contact making member 203 of the switch 200 into engagement of the contact member 201, thereby completing a circuit for the relay B. The relay B is energized to establish a locking circuit for itself at the contacts B—2 and to open its original energizing circuit at the contacts B—1. By the operation of the relay B, there is a circuit completed for the slow to operate relay C. The relay C is energized to complete a circuit for the relay E through the switches C—1 and B—4. The relay E is operated to complete a circuit for the motor 56 so as to drive the transfer frame 77 through the mechanism described into the proper stall. By the operation of the accelerator associated with the motor 56, the switch 270 is closed and the relay I is energized to bring about the operation of the motor 80 in such direction so as to drive the transfer truck 91 toward the opposite end of the transfer frame 77 in this instance. The transfer frame and transfer truck cooperate to bring about the rolling of the vehicle along the carrier vehicle tracks on to the storage rack in the proper stall. When the transfer truck is properly positioned at its limit of movement the limit switch 216 is operated to open the circuit of the relay I. The relay I is deenergized to open the circuit of the motor 80. When the transfer frame reaches its limit of movement, the switch 213 is operated to open the circuit of the relay E. The relay E is deenergized to bring about the cessation of the operation of the motor 56. With the transfer truck and the transfer frame in this position, there is a circuit completed by way of the switches 262 and 263, which are now closed for the relays J and K in parallel. The relays J and K cooperate to complete a circuit for the motor 101 in such direction so as to bring the rollers 118 and 120 to their normal unextended position. The operation of the relay K brings about the deenergization of the relays B and C. When the rollers have reached their normal unextended position, the switch 217 is operated to open the circuit of the relays J and K which deenergize. When the relay K is deenergized, there is a circuit completed through the transfer frame centering switch 225 for the relay D. The relay D is operated to energize the motor 56 in such direction as to bring the transfer frame 77 back to its normal position on the elevator where the circuit of the relay D is opened by the operation of the switch 225.

The elevator operator will now restore the lever 41 to its normal position, thereby centering the carrier frame on the elevator. The elevator may now be moved to any floor as desired.

From the foregoing it is thought that the manner in which an automobile may be taken from the loading floor and stored in the stall or removed from storage in any stall accessible to the particular elevator on any floor will be manifest.

The use of an elevator with a double vehicle moving unit enables two cars to be stored during one vertical movement of the elevator or enables two cars to be removed from storage during one elevator movement. That is, another automobile may be placed on the second carrier frame of the elevator in the same manner as has been already described or cars may be taken from two storage stalls. It is immaterial whether the cars are stored in adjacent stalls on the same floor or one car in one stall on one floor and one on the opposite side of the elevator hatch on the same floor. Likewise the cars may be stored on different floors, through the maximum speed of storing is secured by storing two automobiles in any of the stalls on the same floor of the building. Of course in many instances, only one automobile will be handled during one vertical movement of the elevator, however, the additional capacity permits peak loads in either of the storage or delivery of automobiles to be adequately taken care of, it being possible during the rush hours for one elevator to store approximately two cars per minute under certain conditions. In the same manner approximately two cars per minute may be delivered by one elevator. This is a great advantage since almost double the capacity of one elevator is secured by the additional vehicle moving unit without in any way sacrificing the flexibility of the automobile storage structure. This double vehicle carrying capacity has particular merit during rush hours, as pointed out above, and even when only one vehicle is carried by an elevator in its vertical movement, the system is just as efficient, because one car may be stored or delivered in approximately one interval of one minute.

The elevator operator can initiate the movement of the two vehicle moving units by operating the two levers 41 in substantially the same manner as described. This permits the two vehicle handling operations to proceed simultaneously and two cars may be handled in the same time that it would take to handle one in the system described in the above cited copending application.

By the longitudinal shifting of the carrier frame on the elevator the gap from the carrier rack to the vehicle storage rack is closed without the use of a truckable sill type fire door. In addition, this track extension by the movement of the carrier considerably reduces the mechanical equipment involved and the hazard of the vehicle transferring truck with its rollers fouling on a truckable sill type door or on the swinging brackets illustrated in the prior application. The use of a pneumatic controlling device for regulating this longitudinal movement of the carrier frame eliminates the possibility of the operator damaging the vehicle handling apparatus by negligent operation. It also reduces the shock to the vehicle handling apparatus.

The improved rack drive of the transfer frame in its movement into and from a storage stall reduces the wear on the mechanism and also reduces the cost of construction. Power is applied to the transfer frame at its two outside edges and the load is distributed equally between them. This reduces the effect of any torsional strain on the driving mechanism by freer rolling of the wheels of one side of the automobile than the other.

The use of a chain for driving the transfer truck considerably reduces the cost of the driving mechanism over that illustrated in said prior application and in addition will wear longer and give less trouble.

Attention is directed to the fact that it is impossible for the elevator operator to cause any damage to the automobile or the equipment by initiating the operation of the vehicle handling apparatus at an improper time. This is absolutely vital since an inestimable amount of damage might occur if the vehicle handling operation were initiated at the wrong time. This result is secured by an electro-mechanical locking device described in a simple and highly efficient manner.

The electrical control system illustrated may be modified in various respects to provide for changing conditions or for a complete automatic operation or for complete manual operation. The electrical control illustrated is typical for what may be accomplished.

It is obvious that in the higher type of buildings, it may be desirable to employ only one vehicle handling unit on the elevator that is in buildings higher than fifty stories. Also in lower types of buildings, it may be desirable to mount three of these vehicle moving units on one elevator.

Our invention is not limited to the particular arrangement of apparatus described but may be variously changed and modified without departing from the spirit and scope thereof, as indicated in the appended claims.

We claim:

1. In a vehicle storage system, the combination with a plurality of vehicle storage stalls rising tier on tier, a rack in each stall comprising a pair of spaced apart vehicle wheel guiding runways and an elevator having a platform adapted to travel between the tiers, of a pair of vehicle moving units mounted on said platform, each unit including a pair of spaced apart vehicle wheel guiding tracks, means for moving the elevator to a particular tier of stalls and mechanism mounted on said platform, cooperating with mechanism on said vehicle moving units for shifting said units so that the vehicle wheel guiding tracks of the units abut the vehicle wheel guiding tracks of the adjacent stalls.

2. In a vehicle storage system, the combination with a plurality of stalls arranged tier on tier, an elevator having a platform adapted to travel between the tiers, a pair of vehicle handling mechanisms mounted on said platform, each vehicle handling mechanism comprising a pair of spaced apart vehicle wheel guiding tracks, a frame, mechanism for extending the frame into any stall, a vehicle transferring truck and mechanism for moving the truck along said frame.

3. In a vehicle storage system, the combination with a movable platform, of a vehicle carrier mounted on said platform comprising a first frame provided with vehicle wheel guiding tracks, a second frame supported on said first frame and mechanism for applying power to the edges of said second frame to move said second frame independent of the first frame.

4. In a vehicle storage system, the combination of a vehicle carrier provided with vehicle supporting tracks, a vehicle engaging truck mounted on said carrier and adapted to move a vehicle along said tracks, and mechanism including a chain and sprocket for driving said truck independent of said carrier.

5. In a vehicle storage system, the combination of a movable platform, a plurality of vehicle storage stalls, each stall being provided with a pair of vehicle runways, of a vehicle carrier mounted upon said platform, a pair of vehicle runways on said carrier, means for moving the platform into proximity of a vehicle stall, and mechanism for moving said vehicle carrier to cause the runways thereof to be placed in abutting relation to the runways of the proximate stall.

6. In a vehicle storage system, the combination with a movable platform, a vehicle carrier mounted on said platform provided with a pair of vehicle runways and mechanism for moving said carrier to project said vehicle runways beyond the edge of said platform.

7. In a vehicle storage system, the combination with a movable platform, a vehicle carrier mounted on said platform provided with a pair of vehicle runways and mechanism for moving said carrier to project said vehicle runways beyond the edge of said platform, and a pneumatic device for controlling said projection.

8. In a vehicle storage system, the combination of a movable platform, a vehicle carrier mounted on said platform provided with a pair of vehicle runways and mechanism for projecting said runways in either one of two directions beyond the edges of said platform.

9. In a vehicle storage system, the combination of a movable platform, a vehicle carrier mounted on said platform provided with a pair of vehicle runways, a lever mounted on said platform, a gear connected thereto, and a rack mounted on said carrier meshing with said gear.

10. In a vehicle storage system, the combination of a movable platform, a vehicle carrier mounted on said platform provided with a pair of vehicle runways, a lever mounted on said platform, a gear connected thereto, a rack mounted on said carrier meshing with said gear, and a pawl and cam arrangement for locking said lever in predetermined positions.

11. In a vehicle storage system, the combination of a movable platform, a vehicle carrier mounted on said platform provided with a pair of vehicle runways, mechanism for moving said carrier to project said vehicle runways beyond the edge of said platform, and locking mechanism operative to prevent such projection during movement of said platform.

12. In a vehicle storage system, the combination of a movable platform, a vehicle carrier mounted on said platform provided with a pair of vehicle runways, mechanism for moving said carrier to project said vehicle runways beyond the edge of said platform, locking mechanism operative to prevent such projection during movement of said platform, and an electrical relay for controlling said locking mechanism.

13. In a vehicle storage system, the combination of a movable platform, a vehicle carrier mounted on said platform provided with a pair of vehicle runways, mechanism for moving said carrier to project said vehicle runways beyond the edge of said platform, locking mechanism comprising a cam member mounted on said carrier and a locking pawl mounted on said platform for preventing such projection during movement of the platform.

14. In a vehicle storage system, the combination with a movable platform, a vehicle carrier mounted on said platform provided with a pair of vehicle runways, mechanism for moving said carrier to project said vehicle runways beyond the edge of said platform, locking mechanism operative during movement of the platform to prevent such projection and means for preventing movement of said platform when said locking mechanism is not operative to lock said carrier against movement.

15. In a vehicle storage system, a movable platform, an automobile carrier mounted on said platform for movement therewith and with respect thereto, means for moving said platform, locking mechanism operative to lock said carrier and platform to prevent the independent movement of the carrier during the movement of the platform, and automatic means for operating said locking mechanism to lock the carrier against movement on said platform upon the operation of said platform moving means.

16. In a vehicle storage system, a plurality of stalls arranged tier on tier, an elevator having a platform adapted to travel between the tiers, a vehicle carrier mounted on said platform for movement therewith and with respect thereto, means for moving said elevator, means for moving said carrier independent of said elevator, locking mechanism for locking said carrier to prevent the independent movement thereof during the movement of said elevator and automatic means for operating said locking mechanism to release said carrier when the elevator movement stops.

17. In a vehicle storage system, a vehicle carrier having a pair of vehicle supporting runways thereon, mechanism for shifting the vehicle carrier so as to move said runways lengthwise and a pneumatic device for controlling said movement.

18. In a vehicle storage system, a movable supporting structure, a vehicle carrier mounted on said structure for movement therewith, and with respect thereto, an air cylinder having inlet and outlet valves mounted on said carrier, a piston adapted to travel within said cylinder mounted on said structure and means for moving said carrier independent of said platform to move said cylinder.

19. In a vehicle storage system, the combination of a movable supporting structure, a vehicle carrier mounted on said structure for movement therewith and with respect thereto, a pair of vehicle supporting runways on said carrier, a vehicle transferring device for moving a vehicle along said runways mounted on said carrier, mechanism for moving said carrier, and automatic means operative as a result of such movement for moving said transferring device with respect to said carrier.

20. In a vehicle storage system, the combination of a movable supporting structure, a vehicle carrier mounted on said structure for movement therewith and with respect thereto, a pair of vehicle supporting runways on said carrier, a vehicle transferring device for moving a vehicle along said runways mounted on said carrier, mechanism for moving said carrier, mechanism for moving said transferring device independent of said carrier and automatic means operative as a result of the movement of the carrier to operate said mechanism.

21. In a vehicle storage system, the combination with a plurality of vehicle storage stalls of a movable platform, a vehicle carrier mounted on said platform for moving therewith and with respect thereto, a pair of vehicle supporting runways carried by said platform, a vehicle transferring device, means for moving said platform into proximity of a vehicle storage stall, mechanism for moving said carrier and automatic means initiated upon such movement for causing said transferring device to roll a vehicle along said runways.

22. In a vehicle storage system, a movable platform, a vehicle carrier mounted on said platform for movement therewith and with respect thereto, a pair of racks mounted on said carrier, a gear adapted to mesh with each rack, and a shaft connecting such gears rotatably connected on said platform.

23. In a storage building having a plurality of superimposed floors, an elevator for lifting an object to a desired floor, said elevator having a movable upper platform portion, a vehicle receiving portion adjacent said elevator, and a carrier movable on said receiving portion and elevator to transfer objects from one to the other, said upper platform portion of the elevator being movable adjacent the end of said receiving portion to facilitate movement of the carrier into and out of the elevator.

24. In a storage building, a vehicle receiving portion, a vehicle carrier movable adjacent to said receiving portion, said carrier having a movable upper platform structure, and a second carrier movable on said receiving portion and said first carrier to transfer objects from one to the other, said movable platform structure of the first carrier being movable adjacent the end of said receiving portion to facilitate movement of the second carrier into and out of the first carrier.

SAMUEL E. BUETTELL.
JULIUS J. GRUENFELD.